US007197313B1

(12) United States Patent
Sohn

(10) Patent No.: US 7,197,313 B1
(45) Date of Patent: Mar. 27, 2007

(54) METHOD FOR ALLOCATING WIRELESS RESOURCE IN WIRELESS COMMUNICATION SYSTEM

(75) Inventor: Byoung-chul Sohn, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/476,372

(22) Filed: Jan. 3, 2000

(30) Foreign Application Priority Data

Dec. 31, 1998 (KR) ................................. 98-63169

(51) Int. Cl.
*H04Q 7/20* (2006.01)

(52) U.S. Cl. ........................................ 455/450

(58) Field of Classification Search ............... 455/450, 455/435.1, 436, 434, 525, 509, 516, 517, 455/447, 452, 453, 455, 432, 515; 370/338, 370/401, 394, 329, 330, 331, 332, 333, 461, 370/348, 437, 345, 347; 714/43, 4

See application file for complete search history.

(56) References Cited

U.S. PATENT DOCUMENTS

| 5,210,786 | A | * | 5/1993 | Itoh ............................. 379/59 |
| 5,555,266 | A | * | 9/1996 | Buchholz et al. ........... 370/95.1 |
| 5,696,903 | A | * | 12/1997 | Mahany ....................... 395/200 |
| 5,787,080 | A | * | 7/1998 | Hulyalkar et al. ........... 370/348 |
| 5,889,772 | A | * | 3/1999 | Fischer et al. .............. 370/346 |
| 5,898,679 | A | * | 4/1999 | Brederveld et al. ......... 370/315 |
| 5,949,777 | A | * | 9/1999 | Uyesugi et al. ............. 370/345 |
| 5,953,706 | A | * | 9/1999 | Patel ............................ 705/6 |
| 6,064,649 | A | * | 5/2000 | Johnston .................... 370/232 |
| 6,141,336 | A | * | 10/2000 | Bauchot et al. ............. 370/348 |
| 6,275,487 | B1 | * | 8/2001 | Szalajski et al. ............ 370/347 |
| 6,483,826 | B1 | * | 11/2002 | Akerberg .................... 370/335 |
| 2005/0050432 | A1 | * | 3/2005 | Chen et al. ................. 714/776 |

FOREIGN PATENT DOCUMENTS

| JP | 5-91009 | 4/1993 |
| JP | 6-152600 | 5/1994 |
| JP | 6-232871 | 8/1994 |
| JP | 06-284062 | 10/1994 |
| JP | 8-149113 | 6/1996 |
| JP | 10-164073 | 6/1998 |

* cited by examiner

*Primary Examiner*—Melody Mehrpour
*Assistant Examiner*—Naghmeh Mehrpour
(74) *Attorney, Agent, or Firm*—Sughrue Mion, PLLC

(57) ABSTRACT

A wireless resource allocation method considering retransmission in a wireless communication system is provided. In the wireless communication system including a plurality of wireless terminals and a single access point (AP) having a bridge function, the AP allocates a wireless resource to each wireless terminal and receives data from the wireless terminal. The AP performs a check to determine whether there is an error in the data which was received from a wireless terminal. When detecting an error from the data, the AP sends an error occurrence message and allocates a wireless resource for retransmission of the data to the wireless terminal simultaneously within one frame.

6 Claims, 3 Drawing Sheets

METHOD FOR ALLOCATING WIRELESS RESOURCE IN WIRELESS COMMUNICATION SYSTEM

BACKGROUND OF THE INVENTION

1. Field of the Invention

The present invention relates to a method for allocating a wireless resource in a wireless communication system, and more particularly, to a wireless resource allocation method considering retransmission in a wireless communication system. The present application is based upon Korea Application No. 98-63169, which is incorporated herein by reference.

2. Description of the Related Art

Generally, a wireless communication system includes a single access point (AP) having a bridge function and a plurality of wireless terminals. Each wireless terminal shares wireless resources with the AP so that the wireless terminal can communicate with the AP. A medium access control (MAC) mode with respect to the shared wireless resources and a wireless resource allocation method are defined between each wireless terminal and the AP.

FIG. 1 is a flow chart of a conventional wireless resource allocation method between a wireless terminal and an AP. Primarily, the wireless terminal determines whether data to be transmitted exists in step 112. If the data to be transmitted exists, the wireless terminal requests the AP to allocate a wireless resource thereto in step 114. The AP allocates the wireless resource to the wireless terminal considering the wireless resource allocation request of the wireless terminal and its own transmission data. At this time, the wireless resource may be a bandwidth or a time slot.

Subsequently, the wireless terminal transmits the data to the AP in units of packets or slots in step 118. The AP checks the data received from the wireless terminal to determine whether an error occurs using error check information such as cyclic redundancy check (CRC) in step 120. If an error occurs, the AP informs the wireless terminal that there is an error in the received data in step 122. The wireless terminal then requests the AP to allocate a wireless resource for retransmission to retransmit the data that had an error in step 124. The AP allocates the wireless resource requested by the wireless terminal in step 126. The wireless terminal thus retransmits the data from which the error was detected to the AP in step 128.

However, in the conventional wireless resource allocation method as shown in FIG. 1, retransmission of data is delayed when there is an error in data transmitted from a wireless terminal due to the communication for wireless resource allocation between an AP and the corresponding wireless terminal. Moreover, each wireless terminal wastes a wireless resource by transmitting a message to request the wireless resource allocation for data retransmission to the AP, thereby decreasing an actual data transmission rate.

SUMMARY OF THE INVENTION

It is an object of the present invention to provide a wireless resource allocation method in a wireless communication system comprising a single access point (AP) and a plurality of wireless terminals, wherein the AP informs a corresponding wireless terminal of an error occurrence and simultaneously allocates a wireless resource to the corresponding wireless terminal when there is an error in data received from each wireless terminal, thereby reducing the time required for data transmission and increasing the efficiency of bandwidth use.

To achieve the object of the present invention, there is provided a wireless resource allocation method in a wireless communication system including a plurality of wireless terminals and a single AP having a bridge function. The method includes the steps of allocating a wireless resource to a corresponding wireless terminal and receiving data from the wireless terminal in the AP, performing a check to determine whether there is an error in the data which was received from the wireless terminal by the AP, and sending an error occurrence message and allocating a wireless resource for retransmission of the data to the wireless terminal simultaneously within one frame when the AP detects a data error in the checking step.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENT

Figure 1:
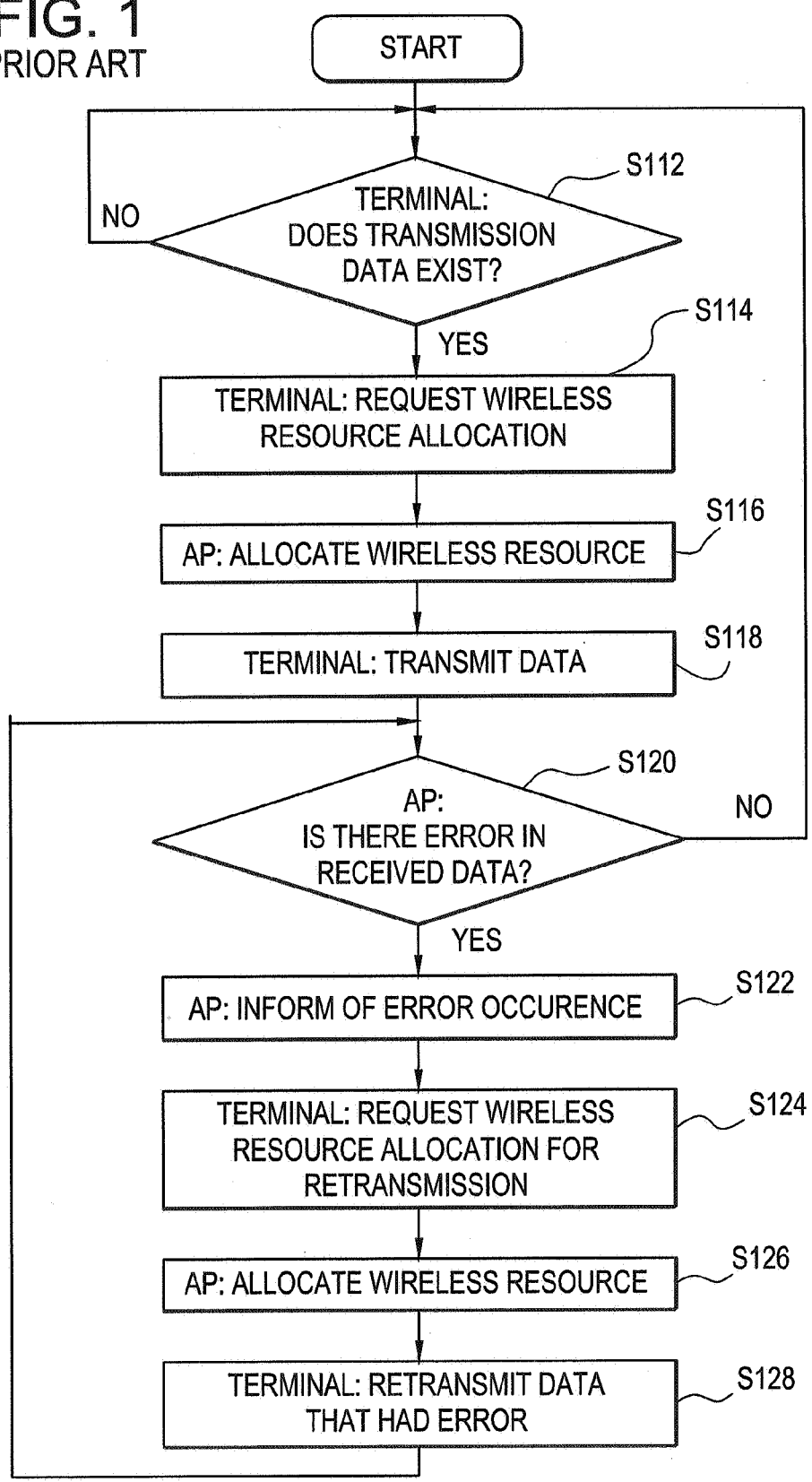
FIG. 1 is a flow chart of a conventional wireless resource allocation method between a wireless terminal and an access point (AP)
Figure 2:
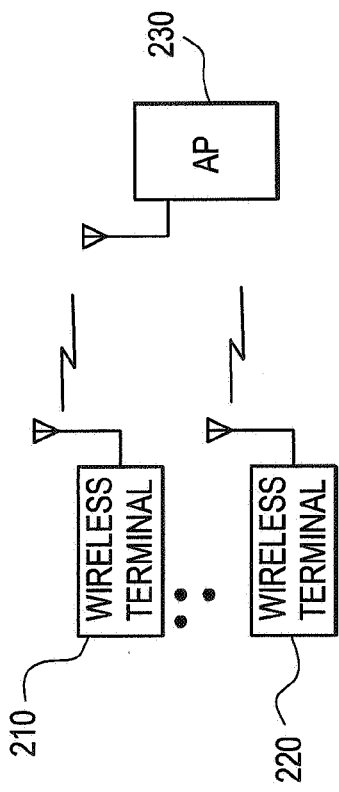
FIG. 2 shows the configuration of a wireless communication system according to the present invention.

Referring to FIG. 2, a wireless communication system of the present invention comprises a plurality of wireless terminals 210 and 220 and a single access point (AP) 230. The wireless terminals 210 and 220 can communicate with each other through the AP 230. The AP 230 and the wireless terminals 210 and 220 communicate with one another using common wireless resources. A wireless medium access control (MAC) protocol is defined between the AP 230 and the wireless terminals 210 and 220 to prescribe an access control method for the wireless resources.

Each of the wireless terminals 210 and 220 requests the AP 230 to allocate a wireless resource thereto when each has data to transmit and then transmits the data when the wireless resource is allocated. When an error is detected from the data received from each of the wireless terminals 210 and 220, the AP 230 sends an error occurrence message and allocates a wireless resource to each of the wireless terminals 210 and 220.

Figure 3:
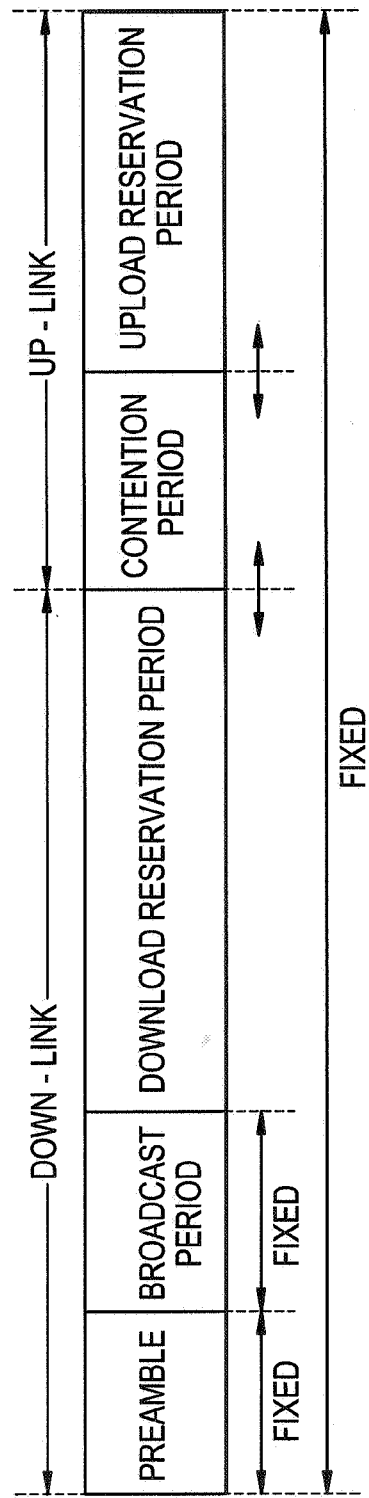
FIG. 3 shows the structure of a frame in the environment of the wireless communication system of FIG. 2.

FIG. 3 shows a frame structure employed in the wireless communication system of FIG. 2. The frame of FIG. 3 is a time unit for communication of data between each wireless terminal and the AP. The frame structure of FIG. 3 is divided into a down-link period in which the AP transmits a message to each wireless terminal and an up-link period in which each wireless terminal transmits a message to the AP. The down-link period comprises a preamble for synchronization, a broadcast period and a download reservation period for message transmission to each wireless terminal. The broadcast period is for transmitting a message which all wireless terminals must receive. During the broadcast period, the AP transmits a broadcast message and various control information, such as length of the download reservation period, location and length of a message which a wireless terminal receives during the download reservation period, length of a contention period, length of an upload reservation period, location and length allocated to a message which will be transmitted by the wireless terminal during the upload reservation period, and acknowledge (ACK) or not acknowledge (NAK) information which the wireless terminal transmitted to the AP during the upload reservation period of the previous frame. The up-link period comprises a contention period for sending a reservation request message for a wireless resource which will be allocated during the upload reservation period of the next frame for transmission of a message in the next frame and an upload reservation period in which each wireless terminal transmits a message to the AP for an allocated period of time.

Figure 4:
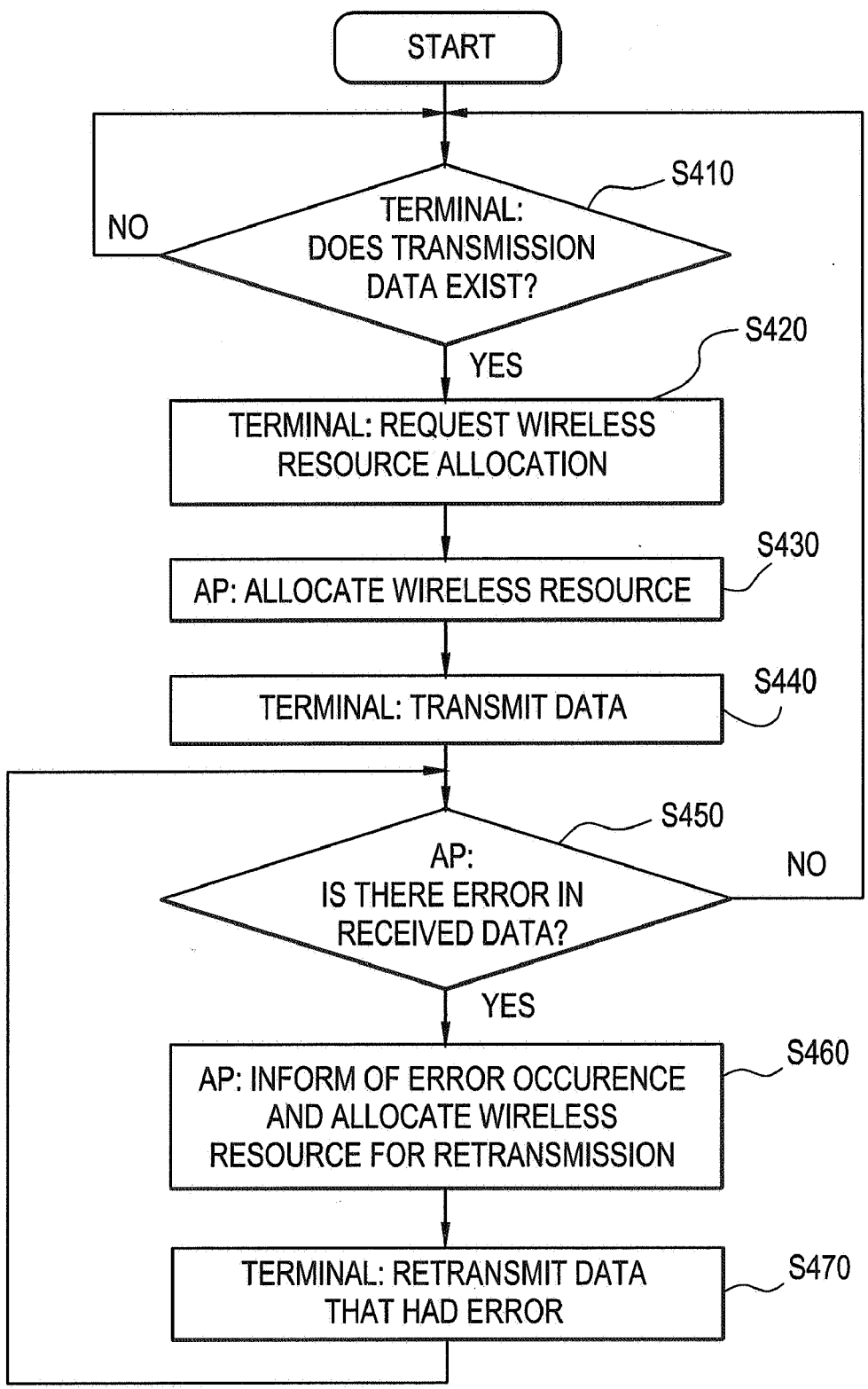
FIG. 4 is a flow chart of a wireless resource allocation method in the wireless communication system of FIG. 2 according to the present invention.

FIG. 4 is a flow chart of a wireless resource allocation method according to the present invention. Primarily, a wireless terminal performs a check to determine whether data to be transmitted to the AP exists in a transmission queue which is a kind of first-in first-out memory in step 410. If the data exists, the wireless terminal requests wireless resource allocation of the AP in step 420. The AP allocates a wireless resource to the wireless terminal which requested the wireless resource allocation in step 430. Subsequently, the wireless terminal transmits the data to the AP in units of packets during the up-link period shown in FIG. 3 in step 440. At this time, the wireless terminal adds error check information such as CRC to the data and transmits them in the format of a packet.

The AP 230 performs a check to determine whether an error occurs in the data received from the wireless terminal using the error check information in step 450. If the AP 230 detects an error from the received data, the AP 230 sends a message of an error occurrence and allocates a wireless resource to the corresponding wireless terminal simultaneously within one frame as shown in FIG. 3. For example, during the broadcast period of the down-link period, the AP sends an error occurrence message to the wireless terminal and, simultaneously, allocates a wireless resource such as a bandwidth or a time slot to the wireless terminal to allow the wireless terminal to retransmit the data, which had an error, to the AP during the upload reservation period of the up-link period in step 460. The error occurrence message includes NAK information and wireless allocation information transmitted during the broadcast period of the down-link period. In other words, when detecting an error from the data received from the wireless terminal, the AP automatically allocates the wireless resource to the corresponding wireless terminal regardless of a wireless resource allocation request of the wireless terminal. When receiving the error occurrence message, the wireless terminal retransmits the data using the wireless resource allocated by the AP in step 470.

On the other hand, if the AP does not detect an error from the received data, the AP sends ACK information to the wireless terminal during the broadcast period of the down-link period and stands by to check for the existence or non-existence of data to be transmitted.

As described above, according to the present invention, when an AP detects the occurrence of an error in data, the AP allocates a wireless resource for retransmission to a transmitting wireless terminal while informing the corresponding wireless terminal of the occurrence of an error of the data. Therefore, the data that had an error is immediately retransmitted, thereby reducing delay in data transmission. In addition, the wireless terminal does not need to send a wireless resource allocation request message for the retransmission of the data that had an error to the AP, thereby increasing the efficiency of bandwidth use in a wireless communication system.

While this invention has been particularly shown and described with reference to a preferred embodiment thereof, it will be understood by those skilled in the art that various changes in form and details may be made therein without departing from the spirit and scope of the invention as defined by the appended claims.

What is claimed is:

1. A wireless resource allocation method in a wireless communication system including a plurality of wireless terminals and a single access point having a bridge function, the method comprising the steps of:
    (a) allocating a wireless resource to a corresponding wireless terminal and receiving data from said wireless terminal in said access point;
    (b) performing a check to determine whether there is an error in said data which was received from said wireless terminal in said access point in the step (a); and
    (c) sending an error occurrence message and allocating a wireless resource for retransmission of data to said wireless terminal simultaneously when said access point detects a data error in the step (b), wherein said wireless resource is one of a bandwidth and a time slot;
    wherein, in the step (c), said error occurrence message is sent to the corresponding wireless terminal while said wireless resource for retransmission is allocated to the corresponding wireless terminal during a down-link period within one frame comprising the down-link period and an up-link period; and
    wherein said wireless terminal does not send a wireless resource request message for retransmission of said data.

2. The wireless resource allocation method of claim 1, wherein said down-link period comprises a preamble for synchronization, a broadcast period, and a download reservation period.

3. The wireless resource allocation method of claim 1, wherein said up-link period comprises a contention period, and an upload reservation period.

4. The wireless resource allocation method of claim 3, wherein during said down-link period, said access point transmits a broadcast message and various control information.

5. The wireless resource allocation method of claim 4, wherein said various control information includes a length of said download reservation period, a location and a length of a message which said wireless terminal receives during said download reservation period, a length of said contention period, a length of said upload reservation period, a location and a length allocated to a message which will be transmitted by said wireless terminal during said upload reservation period, or acknowledge information or not acknowledge information which said wireless terminal transmitted to said access point during said upload reservation period of a previous frame.

6. A wireless communication method comprising:
    (a) allocating a wireless resource to a corresponding wireless terminal and receiving data from the corresponding wireless terminal, wherein said wireless resource is one of a bandwidth and a time slot;
    (b) performing a check to determine where there is an error in data which was received from the corresponding wireless terminal;

(c) informing the corresponding wireless terminal of error occurrence and allocating the wireless resource for transmission of the data to the corresponding wireless terminal simultaneously when the error occurs in the received data;
wherein said corresponding wireless terminal does not send a wireless resource request message for retransmission of said data, and wherein, in the step (c), said error occurrence message is sent to the corresponding wireless terminal while said wireless resource for retransmission is allocated to the corresponding wireless terminal during a down-link period within one frame comprising the down-link period and an up-link period.

* * * * *